United States Patent
Zeng (10) Patent No.: US 10,351,748 B2
(45) Date of Patent: Jul. 16, 2019

(54) NANOMETER MOLTEN SALT HEAT-TRANSFER AND HEAT-STORAGE MEDIUM, PREPARATION METHOD AND USE THEREOF

(71) Applicant: SHENZHEN ENESOON SCIENCE & TECHNOLOGY CO., LTD., Shenzhen, Guangdong (CN)

(72) Inventor: ZhiYong Zeng, Guangdong (CN)

(73) Assignee: SHENZHEN ENESOON SCIENCE & TECHNOLOGY CO., LTD., Shenzhen (CN)

( * ) Notice: Subject to any disclaimer, the term of this patent is extended or adjusted under 35 U.S.C. 154(b) by 301 days.

(21) Appl. No.: 14/762,938

(22) PCT Filed: Jan. 21, 2014

(86) PCT No.: PCT/CN2014/070967
§ 371 (c)(1),
(2) Date: Jul. 23, 2015

(87) PCT Pub. No.: WO2014/114220
PCT Pub. Date: Jul. 31, 2014

(65) Prior Publication Data
US 2015/0376487 A1    Dec. 31, 2015

(30) Foreign Application Priority Data

Jan. 25, 2013 (CN) .......................... 2013 1 0029569
Feb. 19, 2013 (CN) .......................... 2013 1 0053597
Dec. 26, 2013 (CN) .......................... 2013 1 0731910
Dec. 26, 2013 (CN) .......................... 2013 1 0732781

(51) Int. Cl.
*C09K 5/12* (2006.01)

(52) U.S. Cl.
CPC ...................................... *C09K 5/12* (2013.01)

(58) Field of Classification Search
None
See application file for complete search history.

(56) References Cited

FOREIGN PATENT DOCUMENTS

| CN | 101050355 | 10/2007 |
| CN | 101508888 | 8/2009 |
| CN | 101613593 | 12/2009 |

(Continued)

OTHER PUBLICATIONS

International Search Report filed in PCT/CN2014/070967 dated Apr. 30, 2014.

*Primary Examiner* — Necholus Ogden, Jr.
(74) *Attorney, Agent, or Firm* — Gokalp Bayramoglu (57) ABSTRACT

The present invention provides a nano molten salt heat transfer and heat storage medium, the method of preparation and the application, which belongs to the technical sector of heat storage and transfer. The nano molten salt heat transfer and heat storage medium of the invention means that the metal oxide nano-particles and/or non-metal oxide nano particles are dispersed in the conventional molten salt system to form the nano molten salt heat transfer and heat storage medium by composition. The heat transfer and heat storage medium provided by the invention has the good thermal stability and high thermal conductivity, which is ideally suited for industrial energy storage, thermal storage and transfer system of solar thermal power generation.

11 Claims, 1 Drawing Sheet

(56) References Cited

FOREIGN PATENT DOCUMENTS

| | | |
|---|---|---|
| CN | 101724380 | 6/2010 |
| CN | 103113854 A * | 2/2013 |
| CN | 103113854 | 5/2013 |
| CN | 103289653 | 9/2013 |
| DE | 102011083735 | 4/2013 |
| DE | 102011083735 A1 * | 4/2013 |

* cited by examiner

NANOMETER MOLTEN SALT HEAT-TRANSFER AND HEAT-STORAGE MEDIUM, PREPARATION METHOD AND USE THEREOF

TECHNICAL FIELD

The invention refers to the technical field of heat storage and transfer, specifically to Nanometer molten salt heat-transfer and heat-storage medium, preparation method and use thereof.

TECHNICAL BACKGROUND

At present, the heat storage and transfer mediums used in the technology of industrial energy storage and high temperature solar heat storage mainly includes air, water, conduction oil, molten salt, sodium, aluminum etc metals. Due to the wide operating temperature range, low vapor pressure, low viscosity, good stability, low cost and other features, molten salt has become a potential heat storage and transfer medium in solar-thermal power generation technology, and it is currently applied more and more mature. The high-temperature molten salt mainly includes nitrate, carbonate, sulphate, fluoride, chloride, oxide, etc.

The prominent advantages of nitrate molten salt are as follows: the source of raw material is wide, the cost is low, and the corrosiveness is low. Compared with other molten salts, nitrate molten salt has great advantages. However, the heat of dissolution and thermal conductivity of molten nitrate are low; namely, the molten nitrate is easy to be decomposed at high temperature. In the existing technology, the researchers tried to add other components to the molten nitrate system to solve the problem mentioned above, but the lower limit working temperature of the molten nitrate system improved is improved while improving the upper limit working temperature, and therefore the maintenance cost of obnubilation is increased. Alkali carbonate, featured with high melting point, good thermal stability and high upper application temperature limit, is the first selection of molten salt in the range of solar heat utilization. However, the lower application temperature limit is improved correspondingly, and the maintenance cost is high due to the energy consumption. For the molten villiaumite, the latent heat of phase change is high, and the heat storage medium with different temperature of phase change can be obtained by mixing the villiaumite with different melting point, and therefore the requirements of space solar thermal dynamic power generation cycle can be met in a wide temperature range. Villiaumite can meet the requirements on thermal performance and compatibility, but there is an obvious disadvantage that the thermal conductivity is low and the volume is shrunk largely while solidifying.

In the prior art, there is no the molten salt system which can meet relatively high upper limit working temperature and low limit lower working temperature while keeping the relatively high thermal conductivity.

SUMMARY OF THE INVENTION

According to the defects and insufficiencies the technical field mentioned above, the invention provides a nano molten salt based heat-transfer and heat-storage medium and preparation method and application thereof. The nano molten salt heat transfer and heat storage medium provided in the invention has relatively high thermal conductivity which can ensure a relatively low lower limit working temperature while ensuring the high limit working temperature of the whole system. The nano molten salt reduces the maintenance cost effectively, and widens the range of working temperature of molten salt system greatly. It can be widely applied to the technical field of industrial energy storage and solar-thermal power generation.

The technical scheme of the invention is as follows:

Heat transfer and thermal storage medium of nano molten salt, which is characterized in that it is compounded and obtained by dispersing metal oxide nanoparticles and/or non-mental oxide nanoparticles into molten salt system.

said nanoparticles are $SiO_2$, $ZnO$, $Al_2O_3$, $TiO_2$, $MgO$ and/or $CaO$ nano particles, and the average particle diameter of said nanoparticle is 10-30 nm.

The said molten salt system is nitrate molten salt system.

The said nitrate molten salt system is binary nitrate molten salt system. The weight of the said nanoparticles occupies 1%-5% in the said heat transfer and thermal storage medium. The said binary nitrate molten salt system is $KNO3$—$NaNO3$. The portions by weight of each component are: potassium nitrate 20-40 portions and sodium nitrate 60-80 portions.

Or the said binary nitrate molten salt system is $KNO_3$—$NaNO_2$. The portions by weight of each component are: potassium nitrate 30-60 portions and sodium nitrite 40-70 portions.

The said binary nitrate molten salt system is $KNO_3$—$NaNO_3$. The portions by weight of the said components are potassium nitrate 40 portions and sodium nitrate 60 portions.

Or the said binary nitrate molten salt system is $KNO_3$—$NaNO_2$. The portions by weight of the said components: potassium nitrate 55 portions and sodium nitrite 45 portions.

The said nitrate molten salt system is the ternary nitrate molten salt system formed by potassium nitrate, sodium nitrate and sodium nitrite. The ratios of portions by weight of each component of the said heat transfer and thermal storage medium are: potassium nitrate 20-60 portions, sodium nitrate 8-20 portions, sodium nitrite 10-50 portions and nanoparticles 1-5 portions.

The ratios of portions by weight of each component of the said heat transfer and thermal storage medium are: potassium nitrate: 30-45 portions, sodium nitrate 12-15 portions, sodium nitrate 20-40 portions and nanoparticles 4-5 portions.

Said heat transfer and thermal storage medium as claim 3, which is characterized in that the said nitrate molten salt system is the polybasic nitrate molten salt system composed mainly of potassium nitrate, sodium nitrate, sodium nitrite and cesium nitrate. The content of mass percentage of each component of the said heat transfer and thermal storage medium respectively are: potassium nitrate 20%-60%, sodium nitrate 10%-20%, sodium nitrate 10%-50%, cesium nitrate 5%-10%. The said nano particles are 1%-5% of the total mass of the said polybasic nitrate molten salt system.

Heat transfer and thermal storage medium the said molten salt system is carbonate molten salt system formed by potassium carbonate, sodium carbonate, lithium carbonate and sodium chloride. the ratios of portions by weight of each component of the said heat transfer and thermal storage medium are: potassium carbonate 30~60 portions; sodium carbonate 20~50 portions; lithium carbonate 10~30 portions; sodium chloride 3~10 portions; nano particles 1~5 portions.

The application of said heat transfer and thermal storage medium of the nano molten salt in the industrial energy storage or solar thermal power generation.

Method for preparing heat transfer and thermal storage medium of the nano molten salt, includes the following steps:

Heat the molten salt system into a molten state.

Add the nano particles in proportion into the melted molten salt system, insulate after stirring evenly, and then obtain the high-temperature molten salt.

Cool said high-temperature molten salt and obtain the heat transfer and thermal storage medium of the nano molten salt.

Said nano particles said are $SiO_2$, $ZnO$, $Al_2O_3$, $TiO_2$, $MgO$ and/or $CaO$, and the average particle diameter of said nanoparticle is 10-30 nm.

Said molten salt system said is nitrate or carbonate molten salt system.

Figure 1:
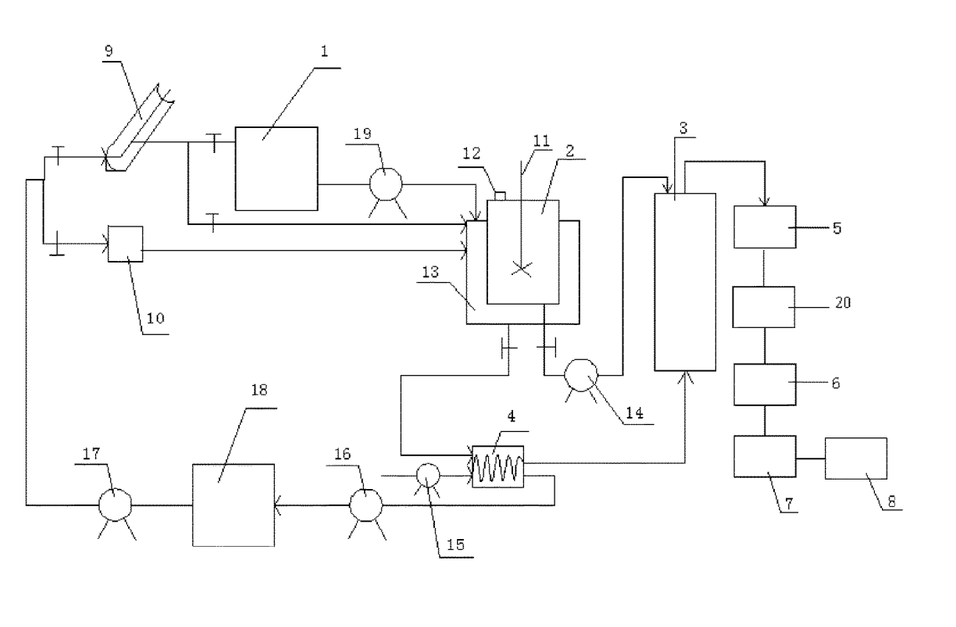

Said method for preparing which is characterized in that uses the devices including the portable electric tracing (10), solar energy collector system (9), molten salt tank (2) with jacketing (13), gas flow crushing dryer (3), hot air generator (4), granulating device (5), cooling equipment (20), stirring equipment (11), inlet of feed (12).

Said molten salt tank (2), gas flow crushing dryer (3), granulating device (5), cooling equipment (20) are connected in series by pipe sequentially. The hot air generator (4) and said gas flow crushing dryer (3) are connected in series by pipe. The portable electric tracing (10) and said solar energy collector system (9) are connected in parallel to each other, which are in series with the jacketing (13) by pipe respectively;

The said stirring equipment (11) is located in the said molten salt tank (2), the said inlet of feed (12) is located on the top of molten salt tank (2).

Another pipe from the said solar energy collector system (9) is connected in series with jacketing (13). High-temperature storage tank (1) is set on the said pipe.

The said hot air maker (4) is heat exchanger, the said jacketing (13), the said heat exchanger, the said gas flow crushing dryer (3) are connected in series one by one through pipeline. The said heat exchanger is connected with one air blower (15), as well.

The said device include also the cryogenic storage tank (18). The said heat exchanger is connected in series with the cryogenic storage tank (18) by pipe. There is the pump (17) from the said cryogenic storage tank (18) by pipe. There are 2 pipes, from the said pump (17), which are connected in series with the said solar energy collector system (9) and the portable electric tracing (10) respectively. there are respectively valves between the pump (17) and the said solar energy collector system (9), and between the pump (17) and the portable electric tracing (10). The said valves are used to control the flowing direction of heat carrier in the cryogenic storage tank (18).

TECHNICAL EFFECT

The nano particle adopted in the invention conforms to the industrial pure grade, that is to say, the materials with industrial pure grade and higher pure grade can be used in the invention, and the impurities contained in it have small impact on the effect in the invention. The nano molten salt in the invention can be widely used in the field of the industrial energy storage and solar thermal power generation technical field.

In the nano molten salt heat transfer heat storage medium provided by the invention, the nano particle is uniformly distributed in the molten salt. In the high-temperature liquid phase state, the nano particle in the mixed liquid is stably suspended. Since the nano particle has big specific area and interface effect, the coefficient of heat conductivity and heat transfer area of the molten salt are greatly increased. The molten salt is absorbed into a substrate by virtue of a huge capillary force produced by a nano-void to control the scale and distribution of a hole, thus, making the volume shrinkage small. Due to the effect of the capillary force, the liquid nano molten salt is hardly overflowed from a micropore, solving the problem of liquidity when the high-temperature molten salt is molten.

The invention patent application 200910074994.0 of China discloses a villiaumite-based high-temperature phase change thermal storage composite material, which is obtained by mixing nano-sized gold particle, silver particle and copper particle into the high-temperature phase change villiaumite according to certain ratio, thus overcoming the defects that the villiaumite-based phase-change material has poor heat transfer performance, low thermal conductivity, big volume shrinkage when solidification and other defects; but the gold particle and silver particle are expensive and inapplicable to the large-scale industrial use. the copper particle, as metal simple substance, has less stability than the metallic oxide of copper in the high temperature state. In the prior art, no report that a metallic oxide or nonmetallic oxide nano particle is added in a molten salt system to improve the performance of the molten salt system is reported. Meanwhile, the molten salt system has different problems, and the molten salt systems have different defects with a fluorine molten salt system, therefore, the technical means used for solving the defect of the molten salt systems are different.

According to the invention, the composite phase-change molten salt material is prepared by adding the metallic oxide and/or nonmetallic oxide nano particle with high thermal conductivity in the molten system, reducing the volume shrinkage ratio of high-temperature phase change heat storage material and melting point of heat transfer and heat storage medium, and meanwhile, improving the latent heat of phase change of the phase-change material, improving the thermal conductivity of the heat transfer and heat storage medium, and reducing the melting point when guaranteeing the upper limit temperature of higher safe use of the heat transfer and heat storage medium, so that the operating temperature of the heat transfer and heat storage medium becomes wide.

The preparation method comprises the processes of heating and stirring the molten salt, degassing and dewatering, adding the nano particle, continuing heating and mixing the obtained system, insulating, cooling and the like.

The nano particle used in the invention can also be the nano particle prepared by yourself. The physical method, gas phase method and chemical method can also be used for preparing the metallic oxide nano particle or nonmetallic oxide nano particle. The physical method refers to a physical smashing method and a mechanical ball milling method; and the physical smashing method refers to obtain the nano particle through mechanical grinding, electric spark explosion and other methods, and it is characterized with simple operation and low cost, but the product purity is low and the particle is not uniformly distributed. The nano particle with pure element and alloy or composite material is obtained by controlling the appropriate condition with the ball milling method; and it is characterized with simple operation and low cost, but the product purity is low and the particle is not uniformly distributed. The gas phase method refers to form the material into gas and adsorb in a certain condition and cool. The chemical method refers to carry out the chemical reaction on two or more than substances in a certain temperature and pressure, and extract, distill and dry.

The data of the embodiment of the invention shows that the latent heat of phase change of the binary nitrate based nano molten salt heat transfer heat storage medium is higher than that of binary molten nitrate salt without adding the nano particle, and the storage energy density is high, thereby, reducing the requirement for the size of the heat storage system; and the energy efficiency is high, and the energy-saving effect is good. The medium can be used and control the formation of the hole to strengthen the heat transfer, and limit the volume shrinkage while the solid liquid phase change of the binary molten nitrate salt, whose volume shrinkage reduces over the binary molten nitrate salt without adding the nano particle. The melting point of said molten nitrate salt is not reduced remarkably compared with the original binary molten nitrate salt, but, it is reduced to some extent, and due to the addition of the nano particle, the thermal conductivity heat stability of the binary molten nitrate salt are greatly improved, thereby, avoiding the defects of easy local overheating when the high-temperature molten salt is generally used, and greatly expanding the operating temperature range of the binary molten nitrate salt system, therefore, it can be widely used in the field of the industrial energy storage and high temperature solar heat storage technology.

The inventor of the invention prepares a composite phase-change molten salt material by adding the metallic oxide and/or nonmetallic oxide nano particle with high thermal conductivity into a ternary nitrate molten salt, so that the volume shrinkage ratio of the high-temperature phase change heat storage material is reduced, and meanwhile, the latent heat of phase change of the phase-change material is also improved, and the thermal conductivity of the heat transfer and heat storage medium is improved, but the melting point of the heat transfer and heat storage medium is not improved; and while guaranteeing the low melting point of the heat transfer and heat storage medium, its upper limit temperature is improved so that the operating temperature of the heat transfer heat storage medium becomes wide.

The ternary nano nitrate molten salt heat transfer and heat storage medium of the present invention not only overcomes the disadvantage of the low upper limit working temperature, small thermal conductivity and small solution heat, but also solves the problems of corrosion and increasing of cost caused by LiNO3 in China patent 00111406.9 and the U.S. Pat. No. 7,588,694B1, and worse thermal stability problem of calcium nitrate from KNO3-NaNO3-Ca(NO3)2 in China's patent system 201110425668.7. This high temperature composite ternary nano molten nitrate salt can reach to a lowest melting point at 120 and 600 highest upper limit operating temperature with good thermal stability and high thermal conductivity. It is well suited for industrial energy storage and solar-thermal power generation heat transfer and heat storage system.

The invented ternary nano molten nitrate salt heat transfer and heat storage medium has the following advantages and positive effects.

1. The ternary nano molten nitrate salt heat transfer and heat storage medium of the present invention has either the heat transfer performance of molten salt nitrate and improves the safe operating temperature. The highest upper limit of the operating temperature can be up to 600° C. The range of the operating temperature is more wide and thermal stability is better.

2. The ternary nano nitrate molten salt heat transfer and heat storage medium of the present invention has a high energy utilization and great energy-saving effect due to its big latent heat of phase change and high energy storage density reducing the requirement of the size of the heat storage system and request of energy.

3. The ternary nano molten nitrate salt heat transfer and heat storage medium of the present invention keeps the low lower limit of operating temperature of common ternary molten salt nitrate so it is beneficial to reduce the energy consumption of insulation and prevent the molten salt being condensed in the pipe line.

4. The ternary nano molten nitrate salt heat transfer and heat storage medium of the present invention can be widely used in solar-thermal power generation technology field due to that it can do well in heat absorption and heat storage, obviously improve the coefficient of thermal conductivity greatly, overcome shortcomings of the poor thermal conductive performance and partial overheating.

The polybasic nano nitrate molten salt heat transfer and heat storage medium of the present invention except with heat transfer performance of nitrate molten salt, it further improves the safe operating temperature upper limit to 600° C. to a wider operating temperature range and better thermal stability.

The carbonated nanometer molten salt heat transfer and heat storage medium of the present invention provides big latent heat of phase change which can reach up to 300 J/g. Comparing with the carbonate molten salt without nano particles, its latent heat of phase change gets great improvement. The high energy storage density, it lowers the requirements on the size of heat storage system, and makes higher energy utilization rate and better energy saving effect.

This medium takes advantage of the formation of and controls cavity to strengthen heat transfer, to enhance heat transfer, and to restrict phase change volume shrinkage of carbonate molten salt solid liquid by reducing about 14% less than that without nanoparticles. The carbonated nanometer molten salt heat transfer and heat storage medium of the present invention has good heat absorption and heat storage capacity. The coefficient of thermal conductivity is obviously higher with upper limit temperature up to 800° C. and melting point to 260° C., and overcoming the shortage of poor thermal conductive performance and local overheating of carbonated nanometer molten salt. It is widely used in solar thermal power generation technology.

This carbonated nanometer molten salt heat transfer heat storage medium of the present invention has the following advantages and positive effects:

1. With good heat stability, good heat conduction performance, good heat absorption, good heat storage capacity and high thermal conductivity, it overcomes the disadvantages of easy partially overheating of common carbonate nano molten salt.

2. With high upper limit operating temperature up to 800° C., low melting point to 260° C., it is beneficial to reduce the energy consumption of heat preservation, and to prevent molten salt from being condensed in the pipe line.

3. As the lower limit of temperature is low and the requirements on the size of system and energy are not high, its energy utilization rate is high and energy-saving effect is good.

4. Volume shrinkage ratio is 14% smaller than carbonate molten salt without nanoparticles.

5. Latent heat of phase change is high and up to 300 J/g. Comparing with the carbonate molten salt without nanoparticles, the latent heat of phase change is improved greatly and it has higher energy storage density which can satisfy the high temperature solar energy heat utilization, is very suitable for solar thermal power generation system and heat transfer and heat storage system of solar thermal power generation.

The devices for preparing the Nano molten salt of the present invention are as follows:

The device includes portable electric heat tracing (10), solar collector system (9), molten salt tank (2) with interlayer (13), airflow pulverization dryer (3), the hot air generator (4), granulating device (5), the cooling device (20), stirring device (11), feed inlet (12);

The mentioned molten salt tank (2), airflow pulverization dryer (3), granulating device (5), cooling device (20) are connected in series through the pipe. The mentioned hot air generator (4) and airflow pulverization dryer (3) are connected in series through the pipe. The mentioned portable electric heat tracing (10) and the solar collector system (9) are connected in series respectively via the pipe with the mentioned interlayer (13). Mobile electric heat tracing (10) or solar collector system (9), heat the heating carrier to heat the molten salt tank (2) to prepare high temperature molten salt. Then the high temperature molten salt prepared inpour through the pipeline the upper of airflow pulverization dryer (3), while the hot air from hot air generator (4) flow in from the lower of airflow pulverization dryer (3), then it achieves the purpose of drying, crushing high temperature molten salt, after drying of high temperature molten salt, it will be stored in granulation device (5) to granulate, and then cool them to get high temperature molten salt in the cooling device (20).

Set the stirring device (11) described in molten salt tank (2). The stirring device (11) is mechanical stirring device, used for stirring and mixing in the process of preparation of molten salt in large-scale. The described feed inlet (12) is put on the top of molten salt tank (2) for easier putting the raw material components of molten salt down.

One other pipe is leading to connect with interlayering (13) on the mentioned solar collector system (9). The high-temperature storage tank (1) is set on the pipeline. The valve between solar collector system (9) and the mentioned high temperature storage tanks (1) is used for controlling the flow status of high carrier into high-temperature storage tank. When the valve between solar collector system (9) and high temperature tank (1) is turned off, the high-temperature molten salt can be prepared by using solar collector system (9) or mobile electric tracing (10) to heat heating carrier to hot the molten salt tank (2). When with abundant energy or molten salt tank no need to be heated, can open the valve between solar collector system (9) and high temperature storage tanks (1), then the heat carrier heated by using solar collector system (9) can go through the pipe and flow to high temperature storage tanks (1) for storage, when need to heat something, it can go through pump (19) then pull to interlayers to heat the molten salt tank (2) for preparing high temperature molten salt.

The mentioned hot air generator (4) is heat exchanger. The mentioned interlayer (13), the mentioned heat exchanger and the mentioned airflow pulverization dryer (3) are connected in series through the pipe. The mentioned heat exchanger is connected with a blower (15). After the high temperature molten salt is prepared, heat-carrier in interlayer (13) of the heat transfer fluid flow through a pipe heat exchanger which is used for heating the air pushed in heat exchanger by drum fan (15), the heated air through a pipe flow from the bottom of the dryer (3) into the top of high temperature molten salt flowing into from the t of the dryer (3), so as to realize the heat carrier of interlining (13) in the waste heat recycling, energy conservation and environmental protection.

The equipment also includes low temperature storage tanks (18). The mentioned heat exchangers is connected in series with low temperature storage tanks (18) by pipe. The mentioned low temperature storage tanks (18) lead a pump III (17) on the other side through a pipeline, described the pump III (17) leads to two pipe respectively with solar system (9), the solar heating system (9) and described portable electric heat tracing (10) in series; there are respectively valves between described Pump III (17) and the solar system (9), and between described the pump III (17) and portable electric heating valve (10), described valves are used to control the flowing direction of heat carrier in the cryogenic storage tank (18).

After the heat carrier flowed from interlining (13) heat the air drum out of from a blower (15) flow through a pipe to low temperature storage tanks (18), and the heat carrier flowing out from low temperature storage tanks (18) can through divided into two lines flow to the portable electric heat tracing (10), used for heating molten salt tank to prepare high temperature molten salt; Or can flow to the solar heating system (9), the heat carrier flowing to the solar heating system (9) or stored in high temperature storage tanks for later being used for heating to prepare high temperature molten salt, or directly used for heating to prepare high temperature molten salt. This design has realized the heat carrier to recycle, reduce costs, energy conservation and environmental protection.

The device also includes bunker (6), packing device (7), and storage device (8). Said bunker (6), packing device (7) through a pipe series, described the packing device (7) and storage device (8) are connected in series; Cool the abovementioned molten salt cornied by cutting device (5), and temporarily store in the bunker (6), and then use packing device (7) for packaging, finally use storage device (8) storage. Set aside.

Pump (14) is set between the mentioned molten salt tank (2) and the mentioned gas flow crushing dryer (3), pump (16) is set between the mentioned heat exchanger and the mentioned low-temperature storage tank; Pump IV (19) is set between the mentioned high-temperature storage tank (1) and the mentioned heat interlayer (13).

Pump I (14) is used to pump in the molten salt prepared in molten salt tank (2) from the top of the gas flow crushing dryer (3) through pipe. Pump II (16) is used to pump the heat carrier out of heat exchanger into low-temperature storage tank (18) through pipe. PumpIV (19) is used to pump the high-temperature heat carrier in the high-temperature storage tank (1) into jacketing (13) to heat molten salt tank (2) to prepare molten salt.

The solar heating system (9) uses slot, tower, disc type or linear Fresnel type way of solar-thermal power generation. From the angle of cost and technical maturity, optimize to select groove and the tower, when trough-type-mirror-field-of-solar-thermal-power-generation was elected as the way to gather solar energy, through high temperature heat carrier in collector tubes. directly heat melt salt tank. The common high temperature heat carrier is high temperature molten salt, heat conduction oil, superheated steam, optimizing heat conduction oil in the slot mirror field. When tower-field-of-solar-thermal-power-generation was elected as a means of gathering solar energy, through the high temperature heat carrier in the collector tubes directly heat melt salt tank. The common high temperature heat carrier is high temperature molten salt, heat conduction oil, superheated steam, optimizing molten salt in the tower mirror field.

A valve is set between the mentioned molten salt tank (2) and described pump I (14). It is used to control whether the high molten salt in the molten salt tank (2) can flow through the pipe to airflow pulverization dryer (3). Another valve is set between the mentioned heat exchanger and described interlayer (13), and the valve is used to control the heat carrier in the interlaying (13) to or not to flow to heat exchanger through a pipe.

The described heat carrier is high temperature molten salt, heat conduction oil, superheated steam.

The device is designed with two heating systems, which is solar collector system (9) and portable electric heating tracing (10), respectively. On sunny day, you can use the solar heating system (9), and high temperature heat carrier gotte partly was use to heat directly the molten salt tank, the other part can be stored directly for meeting needs heat carrier when solar energy is insufficient. Moreover, when solar radiation is insufficient, can also use portable electric tracing (10) to ensure the equipment can be used under insufficient solar radiation. The device make full use of natural energy, energy conservation and environmental protection.

The preparation method of the present invention could select different heating method according to the specific situation, either portable electric heat tracing or solar collector system. If at the scene of the using materials, such as solar thermal power station, it can use accumulated solar-energy directly which is environmental protection and energy saving. In addition, this method makes full use of the waste heat from heat carrier in the interlayer of molten salt tank to heat the needed hot air through the heat exchange device. Furthermore, after the heat carrier in the heat exchanger heats air, it can go through the pipe into the low temperature storage pipe to flow towards the portable electric heat tracing of the solar heating system, then it is heated and used for heating molten salt tank to prepare high temperature carbonated nanometer molten salt. In this way, it achieves the recycling of heat carrier. It reduces cost and energy-saving and environment-friendly. The liquid phase molten salt composite system gotten from this method of the invention can form directly even dry powder after getting through the airflow pulverization dryer which will be easy for selling and ensuring the same and stable performance when it is used.

DESCRIPTION OF FIGURES

FIG. 1 structure diagram of the device used in the invention; Refer to the list as follows: 1—high temperature storage tanks, 2—molten salt tank, 3—airflow pulverization dryer, 4—hot air generator, 5—granulating device, 6—bunker, 7—packaging equipment, 8—storage device, 9—solar heating system, 10—Portable electric heat tracing, 11—stirring device, 12—feeding port, 13—interlaying, 14—pump I, 15—blower, 16—pump II, 17—pump III, 18—low temperature storage tanks, 19—pump IV, 20—cooling device.

BRIEF DESCRIPTION OF SELECTED EMBODIMENTS

For making the purpose of the present invention, the technical scheme and the advantages more clear, the followings describes clearly and completely with the appended drawings of present embodiment about the technical scheme. Obviously, the described embodiment is only partial embodiments rather than all embodiments of the invention. Based on the embodiment in the invention, all other embodiments obtained by the common technicians of the same field without making a creative labor are belonged to the protection scope of the invention.

The specific steps of experiment or conditions that are not indicated in embodiment can be operated according to the operation or conditions of the conventional steps of experiments described in the document of the same field. All the reagent or instruments that are not marked with manufacturer are the conventional reagent purchased through market.

The sources of all the equipments and reagents in the embodiment of the invention: Potassium carbonate, sodium carbonate and lithium carbonate, sodium chloride, potassium nitrate, sodium nitrate, sodium nitrite and nitrate cesium, silica, zinc oxide, aluminum oxide, titanium dioxide, magnesium oxide, calcium oxide, titanium dioxide etc industrial pure grade all are accessed from general chemical products company.

The nanoparticles in the invention can be purchased commercially or prepared by yourself, as long as the selected nanoparticles of $SiO_2$ or $ZnO$, $Al_2O_3$, $TiO_2$, $MgO$ or $CaO$ with average particle size of at 10~30 nm range, it can achieve the purpose of this invention.

In addition, the preparation method of nanoparticles can either adopt gas phase method or by physical method. The nanopartical can be made it by the physical method or purchased, as long as the particle size of nanometer particles in 10~30 nm range, the processing keeps the same. The preparation methods of the nano nitrate molten salt heat transfer and heat storage medium are as follows:

(1) After finishing the molten salt system proportionally, add them from feed inlet into molten salt tank. Open the valve between the interlayer and the solar collector system to make the heat carrier heated by solar heating system to flow toward the molten salt system in the molten salt tank by interlayer static heating, then degass and dewater, make it to molten state. The heating temperature is 50~100° C. above the temperature of molten salt phase change. Insulate for 10~30 min;

(2) Add the Nano particles proportionally to the above mentioned molten salt tank. Stir molten mixture by 0.5~1 h mechanically to make it mixed preliminarily and evenly, then stir again and insulate by another 0.5~1 h to make it mixed evenly and fully to get high temperature molten salt;

(3) Open the discharging hole of the molten salt tank, pump the molten salt of step 2) into the airflow pulverization dryer, at the same time, heat the required hot air through heat-exchanging device by the high temperature heat carrier in the molten salt tank, then make the hot air flow into the airflow pulverization dryer from on the bottom of airflow pulverization drying tower, then granulate, cool to obtain even and steady heat transfer heat storage nanometer molten salt medium.

(4) Put the nano molten nitrate salt heat transfer heat storage medium of step 3) in a bunker, then subpackage and preserve.

It is important to point out: The devices used for the embodiment are the devices researched and developed by the inventor himself. It was equipped with two sets of heating equipments including portable electric heat tracing and solar heat collector. You can choose the heating method according to the actual process. The heat carrier in the molten salt tank interlayer can be high temperature heat conduction oil or molten salt or superheated steam, after the heat carrier heating the molten salt in the molten salt tank, it can make full use of the afterheat to flow it into the heat exchanger for heating hot air.

Note: Embodiments 1~4 are obtained in accordance with the above preparation methods.

Embodiment 1 The Comparison of the Performance of Nano Molten Salt Based on $KNO_3$—$NaNO_3$ Binary Nitrate System 1) Melting Point Test At atmospheric pressure, carry out by adopting universal differential scanning calorimeter (DSC).

2) Heat Stability Test

Test the heat stability of the preparing binary nano nitrate molten salt and the comparison (the original binary molten nitrate salt of each binary nano molten nitrate salt)

Gravimetric method is applied to the testing: Put the molten salt samples needed to be test into different nickel crucibles, then heat the crucibles in controlled temperature stove, and then use analytical balance to weigh. The experiment is began at room temperature, then start to heat from a static state until the solid is melt completely. Every once in a while, when the crucible naturally cools to room temperature, take it out, and weigh it by analytical balance. If the weight of the sample is on longer reduced during a certain range of temperature, raise the temperature of the controlled-temperature stove. Then again, every once in a while, take out the crucible and weigh it by analytical balance, continue to raise the temperature after getting another stable state. Circularly repeat the process, record the specific holding temperature and time, and calculate the loss ratio and surplus ratio that comes from them.

Experimental Result:

The composite binary nano molten nitrate salt produced according to this embodiment and its formulas are shown as table 1.

TABLE 1

Binary Nano Nitrate Molten Salt Prepared According to Embodiment 1

| Number of Binary Nano Nitrate Molten Salt | Weight Percentage and Proportion of $KNO_3$—$NaNO_3$ Molten Salt System(Comparison) | The Kinds of Nano Particle and their Weight Percentage in $KNO_3$—$NaNO_3$ Molten Salt System |
|---|---|---|
| No. 1 | Nitrate of Potash 10%; Sodium Nitrate 90% | Silica ($SiO_2$) 5% |
| No. 2 | | Zinc Oxide (ZnO) 5% |
| No. 3 | | Aluminum Oxide ($Al_2O_3$) 5% |
| No. 4 | | Titanium Dioxide ($TiO_2$) 5% |
| No. 5 | | Magnesia (MgO) 5% |
| No. 6 | Nitrate of Potash 60%; Sodium Nitrate 40% | Silica ($SiO_2$) 3% |
| No. 7 | | Zinc Oxide (ZnO) 3% |
| No. 8 | | Aluminum Oxide ($Al_2O_3$) 3% |
| No. 9 | | Titanium Dioxide ($TiO_2$) 3% |
| No. 10 | | Magnesia (MgO) 3% |
| No. 11 | Nitrate of Potash 40%; Sodium Nitrate 60% | Silica ($SiO_2$) 1% |
| No. 12 | | Zinc Oxide (ZnO) 1% |
| No. 13 | | Aluminum Oxide ($Al_2O_3$) 1% |
| No. 14 | | Titanium Dioxide ($TiO_2$) 1% |
| No. 15 | | Magnesia (MgO) 1% |

1) The result of melting point test shows that compared with corresponding comparison, the melting points of No. 11~15 products are reduced but not obviously. As shown in the table 2.

But with the increase of proportion of added nano particles, the degree that the melting points are reduced becomes more obvious when compared with corresponding comparison, and the range is improved.

TABLE 2

Melting Point Test Results

| Number of Binary Nano Nitrate MoltenSalt | Melting Point ° C. |
|---|---|
| Comparison: Nitrate of Potash 10%; Sodium Nitrate 90% (Latent heat of phase change is big, and melting point is too high) | 270 |
| No. 1 | 252 |
| No. 2 | 250 |
| No. 3 | 251 |
| No. 4 | 254 |
| No. 5 | 251 |
| Comparison: Nitrate of Potash 60%; Sodium Nitrate 40% (Characteristic: low melting point, small latent heat of phase change) | 210 |
| No. 6 | 201 |
| No. 7 | 202 |
| No. 8 | 200 |
| No. 9 | 198 |
| No. 10 | 199 |
| Comparison: Nitrate of Potash 40%; Sodium Nitrate 60% (Latent heat of phase change is big, and melting point is moderate. The cost of Sodium Nitrate is lower than Nitrate of Potash's, so the system is in common use internationally. It is called solar salt.) | 220 |
| No. 11 | 216 |
| No. 12 | 217 |
| No. 13 | 216 |
| No. 14 | 218 |
| No. 15 | 216 |

2) Heat Stability Test, Concrete Results are Shown as Table 3.

TABLE 3

The Statistical Results of the Loss Ratio under 565° C.

| | Time(hour) | |
|---|---|---|
| Number of Binary Nano Nitrate Molten Salt | 30 | 100 |
| Comparison: Nitrate of Potash 10%; Sodium Nitrate 90% | 4% | 10% |
| No. 1 | 2.9% | 8% |
| No. 2 | 2.5% | 7.5% |
| No. 3 | 2.3% | 7.1% |
| No. 4 | 2.1% | 7% |
| No. 5 | 2.4% | 7.4% |
| Comparison: Nitrate of Potash 60%; Sodium Nitrate 40% | 3% | 9% |
| No. 6 | 1.9% | 6.5% |
| No. 7 | 2% | 6.0% |
| No. 8 | 1.9% | 6.4% |
| No. 9 | 1.9% | 6.2% |
| No. 10 | 2% | 6.1% |
| Comparison: Nitrate of Potash 40%; Sodium Nitrate 60% | 2.5% | 8.5% |
| No. 11 | 1.0% | 5% |
| No. 12 | 1.2% | 5.5% |
| No. 13 | 1.2% | 5.2% |
| No. 14 | 1.0% | 4.9% |
| No. 15 | 1.3% | 5.3% |

We can see that in 565° C., adding metallic oxide's nano particles can make products' heat stability of each group increase obviously relative to the comparison.

TABLE 4

The Statistical Results of the Loss Ratio under 660° C.

| Number of Binary Nano Molten Nitrate Salt | Time(hour) 30 | 100 |
|---|---|---|
| Comparison: Nitrate of Potash 10%; Sodium Nitrate 90% | 10% | 30% |
| No. 1 | 7% | 22% |
| No. 2 | 6.5% | 22.5% |
| No. 3 | 6.8% | 23% |
| No. 4 | 6.5% | 22% |
| No. 5 | 6.4% | 21.5% |
| Comparison: Nitrate of Potash 60%; Sodium Nitrate 40% | 9% | 28% |
| No. 6 | 5% | 13% |
| No. 7 | 4.5% | 13.5% |
| No. 8 | 4.6% | 12.5% |
| No. 9 | 4.2% | 12% |
| No. 10 | 4.7% | 13% |
| Comparison: Nitrate of Potash 40%; Sodium Nitrate 60% | 8% | 26% |
| No. 11 | 4% | 12% |
| No. 12 | 3.2% | 10% |
| No. 13 | 3.0% | 9% |
| No. 14 | 2.5% | 8% |
| No. 15 | 2.8% | 9% |

We can see that in 660° C., compared with the comparison, products' heat stability of each group increases obviously.

Embodiment 2 The Comparison of the Performance of Nano Molten Salt Based on $KNO_3$—$NaNO_2$ Binary Nitrate System 1) Melting Point Test At atmospheric pressure, carry out by universal differential scanning calorimeter (DSC).

2) Heat Stability Test

Test the heat stability of the preparing binary nano molten nitrate salt and the comparison (the original binary molten nitrate salt of each binary nano molten nitrate salt).

Gravimetric method is applied to the testing. (The method is the same as Embodiment 1):

Experimental Result:

The composite binary nano molten nitrate salt prepared according to this embodiment and its formulas are shown as table 5.

TABLE 5

Binary Nano Nitrate Molten Salt Prepared According to Embodiment 2

| Number of Binary Nano Nitrate Molten Salt | Weight Percentage and Proportion of $KNO_3$—$NaNO_3$ Molten Salt System(Comparison at the same time) | The Kinds of Nano Particles and their Weight Percentage in $KNO_3$—$NaNO_3$ Molten Salt System |
|---|---|---|
| No. 16 | Nitrate of Potash 30%; Sodium Nitrite 70% | Silica ($SiO_2$) 1% |
| No. 17 | | Zinc Oxide (ZnO) 1% |
| No. 18 | | Aluminum Oxide ($Al_2O_3$) 1% |
| No. 19 | | Titanium Dioxide ($TiO_2$) 1% |
| No. 20 | | Magnesia (MgO) 1% |
| No. 21 | Nitrate of Potash 60%; Sodium Nitrite 40% | Silica ($SiO_2$) 3% |
| No. 22 | | Zinc Oxide (ZnO) 3% |
| No. 23 | | Aluminum Oxide ($Al_2O_3$) 3% |
| No. 24 | | Titanium Dioxide ($TiO_2$) 3% |
| No. 25 | | Magnesia (MgO) 3% |
| No. 26 | Nitrate of Potash 55%; Sodium Nitrite 45% | Silica ($SiO_2$) 5% |
| No. 27 | | Zinc Oxide (ZnO) 5% |
| No. 28 | | Aluminum Oxide ($Al_2O_3$) 5% |
| No. 29 | | Titanium Dioxide ($TiO_2$) 5% |
| No. 30 | | Magnesia (MgO) 5% |

1) The result of melting point testing shows that compared with corresponding comparison, the melting points of No. 16~30 products are reduced a little bit but not obviously. As shown in the Table 6.

TABLE 6

Melting Point Testing Result

| Number of Binary Nano Nitrate Molten Salt | Melting Point |
|---|---|
| Comparison: Nitrate of Potash 30%; Sodium Nitrite 70% | 207 |
| No. 16 | 202 |
| No. 17 | 201 |
| No. 18 | 200 |
| No. 19 | 203 |
| No. 20 | 200 |
| Comparison: Nitrate of Potash 60%; Sodium Nitrite 40% | 134 |
| No. 21 | 128 |
| No. 22 | 125 |
| No. 23 | 128 |
| No. 24 | 124 |
| No. 25 | 125 |
| Comparison: Nitrate of Potash 55%; Sodium Nitrite 45% | 132 |
| No. 26 | 126 |
| No. 27 | 128 |
| No. 28 | 122 |
| No. 29 | 127 |
| No. 30 | 125 |

2) Heat Stability Test, Concrete Results are Shown as Table 7.

TABLE 7

The Statistical Results of the Loss Ratio under 500° C.

| Number of Binary Nitrate Nano Molten Salt | Time(hour) 30 | 100 |
|---|---|---|
| Comparison: Nitrate of Potash 30%; Sodium Nitrite 70% | 4% | 9.5% |
| No. 16 | 2.7% | 7.5% |
| No. 17 | 2.4% | 7.2% |
| No. 18 | 2.5% | 7.1% |
| No. 19 | 2.3% | 7% |
| No. 20 | 2.2% | 7.% |
| Comparison: Nitrate of Potash 60%; Sodium Nitrite 40% | 3.5% | 9% |
| No. 21 | 2.0% | 6.8% |
| No. 22 | 2.1% | 6.5% |
| No. 23 | 1.9% | 6.% |
| No. 24 | 2.1% | 6.0% |
| No. 25 | 1.9% | 6.0% |
| Comparison: Nitrate of Potash 55%; Sodium Nitrite 45% | 2.8% | 8% |
| No. 26 | 1.5% | 5.5% |
| No. 27 | 1.3% | 5.0% |

TABLE 7-continued

The Statistical Results of the Loss Ratio under 500° C.

| Number of Binary Nitrate Nano Molten Salt | Time(hour) 30 | 100 |
|---|---|---|
| No. 28 | 1.2% | 5.0% |
| No. 29 | 1.3% | 4.5% |
| No. 30 | 1.4% | 5.0% |

We can see that under 500° C., adding metallic oxide's nano particles can make products' heat stability of each group increase obviously relative to the comparison.

TABLE 8

The Statistical Results of the Loss Ratio under 600° C.

| Number of Binary Nitrate Nano Molten Salt | Time(hour) 30 | 100 |
|---|---|---|
| Comparison: Nitrate of Potash 30%; Sodium Nitrite 70% | 10% | 30% |
| No. 16 | 6.5% | 23% |
| No. 17 | 6.8% | 24% |
| No. 18 | 7.0% | 24% |
| No. 19 | 6.2% | 22% |
| No. 20 | 6.1% | 21.5% |
| Comparison: Nitrate of Potash 60%; Sodium Nitrite 40% | 9% | 28% |
| No. 21 | 5.5% | 14% |
| No. 22 | 4.8% | 13% |
| No. 23 | 4.6% | 12.8% |
| No. 24 | 4.8% | 13.5% |
| No. 25 | 4.5% | 13% |
| Comparison: Nitrate of Potash 55%; Sodium Nitrite 45% | 7.8% | 22% |
| No. 26 | 3.5% | 10% |
| No. 27 | 3.2% | 8% |
| No. 28 | 3.5% | 9% |
| No. 29 | 2.5% | 8% |
| No. 30 | 2.5% | 8.5% |

We can see that in 600° C., compared with the comparison, products' heat stability of each group increases obviously.

Embodiment 3 The Preparation Method of the Heat Transfer and Thermal Storage Medium of Ternary Nitrate Nano Molten Salt According to the formula of ternary nano molten nitrate salt of each group in Embodiment Example 3, the diameter of nano particles in it, as well as the available technology, add the fourth component to the ternary nitrate molten salt and then get the formula of Nitrate Molten Salt (X1) and the formula of Quaternary Nitrate Molten Salt (X2). As shown in the table 9.

Among them, application No. 200710027954.1 is a Chinese invention patent, which discloses a kind of heat transfer and thermal storage medium of molten salt as well as its preparation methods. According to the formula and preparation methods recorded in Embodiment 1, the patent inventor succeeds in making nitrate molten salt with additive. As shown in X1.

Application No. 00111406.9 is another Chinese invention patent, which discloses one kind of mixed molten salt —$LiNO_3$—$KNO_3$—$NaNO_3$—$NaNO_2$ and its preparation method. According to the formula and preparation method recorded in the document he applied, the patent inventor succeeds in making Quaternary molten nitrate salt. As shown in X2.

TABLE 9

The Formula of Ternary NitrateNano Molten Salt and the Corresponding Diameter of Nano Particles in Embodiment Example 3

| The Number of Ternary Nano Molten Nitrate Salt | The Part by Weight of Ratio of Ternary Molten Nitrate Salt/kg | /kg The Kinds of the Nano Particles and Parts by Weight/kg | The Average Particle Diameter of Naked Nano Particles/nm |
|---|---|---|---|
| No. 1 | Nitrate of Potash 60, Sodium Nitrate 8, Sodium Nitrite 10 | Silica ($SiO_2$)1, Magnesia (MgO) 1 | 10 |
| No. 2 | | Zinc Oxide (ZnO) 3 | 22 |
| No. 3 | | Aluminum Oxide ($Al_2O_3$) 4 | 12 |
| No. 4 | Nitrate of Potash 20, Sodium Nitrate20, Sodium Nitrite 50 | Titanium Dioxide ($TiO_2$) 1.5 | 18 |
| No. 5 | | Magnesia (MgO) 1.2, Zinc Oxide (ZnO) 1, Titanium Dioxide ($TiO_2$) 0.4, Aluminum Oxide ($Al_2O_3$) 1.6, Silica ($SiO_2$) 0.8 | 30 |
| No. 6 | Nitrate of Potash 25, Sodium Nitrate 15, Sodium Nitrite 40 | Silica ($SiO_2$) 1.3, Zinc Oxide (ZnO) 0.7, Calcium Oxide (CaO) 1 | 20 |
| No. 7 | | $SiO_2$ 1.5, Zinc Oxide (ZnO) 0.5, Aluminum Oxide ($Al_2O_3$) 2.0 | 14 |
| No. 8 | Nitrate of Potash 53, Sodium Nitrate 7, Sodium Nitrite 40 | Aluminum Oxide ($Al_2O_3$) 0.7, Magnesia (MgO) 0.3 | 19 |
| No. 9 | | Titanium Dioxide ($TiO_2$) 1.0, Magnesia (MgO) 0.2, Aluminum Oxide ($Al_2O_3$) 0.8 | 23 |
| No. 10 | | Magnesia (MgO) 2.0, Calcium Oxide (CaO) 0.5 | 16 |
| No. 11 | Nitrate of Potash 45, Sodium Nitrate 14, Sodium Nitrite 40 | Silica ($SiO_2$) 1.5, Aluminum Oxide ($Al_2O_3$) 1.5 | 13 |

TABLE 9-continued

The Formula of Ternary NitrateNano Molten Salt and the Corresponding Diameter of Nano Particles in Embodiment Example 3

| The Number of Ternary Nano Molten Nitrate Salt | The Part by Weight of Ratio of Ternary Molten Nitrate Salt/kg | The Kinds of the Nano Particles and Parts by Weight/kg | The Average Particle Diameter of Naked Nano Particles/nm |
|---|---|---|---|
| No. 12 | | Zinc Oxide (ZnO) 1.3, Titanium Dioxide ($TiO_2$)1.7 | 17 |
| No. 13 | | Aluminum Oxide ($Al_2O_3$)1.2, Titanium Dioxide ($TiO_2$)1.8 | 15 |
| No. 14 | | Zinc Oxide (ZnO) 1, Titanium Dioxide ($TiO_2$) 1, Magnesia (MgO) 1 | 20 |
| No. 15 | | Zinc Oxide (ZnO) 1.0, Titanium Dioxide ($TiO_2$) 0.3, Aluminum Oxide ($Al_2O_3$) 0.6, Silica ($SiO_2$) 1.1 | 27 |
| No. 16 | Nitrate of Potash 30, Sodium Nitrate 15, Sodium Nitrite 40 | Titanium Dioxide ($TiO_2$) 1.3, Silica ($SiO_2$) 2.7 | 11 |
| No. 17 | | Magnesia (MgO) 1.2, Zinc Oxide (ZnO) 1.8, Aluminum Oxide ($Al_2O_3$) 1.0 | 15 |
| No. 18 | | Magnesia (MgO) 2.1, Zinc Oxide (ZnO) 1.9 | 28 |
| No. 19 | | Magnesia (MgO) 1.4, Zinc Oxide (ZnO) 0.6, Aluminum Oxide ($Al_2O_3$) 1.1, Silica ($SiO_2$) 0.9 | 14 |
| No. 20 | Nitrate of Potash 35, Sodium Nitrate 12, Sodium Nitrite 22 | Silica ($SiO_2$) 4 | 16 |
| No. 21 | | Zinc Oxide (ZnO) 2.3, Aluminum Oxide ($Al_2O_3$) 1.7 | 23 |
| No. 22 | | Magnesia (MgO) 3.4, Titanium Dioxide ($TiO_2$) 0.6 | 25 |
| No. 23 | Nitrate of Potash 47, Sodium Nitrate 13, Sodium Nitrite 30 | Magnesia (MgO) 0.4, Zinc Oxide (ZnO) 0.7, Titanium Dioxide ($TiO_2$) 1.1, Silica ($SiO_2$) 1.8 | 24 |
| No. 24 | | Magnesia (MgO) 0.9, Aluminum Oxide ($Al_2O_3$) 0.2, Silica ($SiO_2$) 2.9 | 12 |
| No. 25 | | Magnesia (MgO) 0.3, Zinc Oxide (ZnO) 2.4, Silica ($SiO_2$) 1.4, Calcium Oxide (CaO) 0.5 | 20 |
| X1 | Nitrate of Potash 52.2%, Sodium Nitrate 6.9%, Sodium Nitrite 39.6% Additive Cesium Nitrate 0.3%, Potassium Chloride 1% | 0 | — |
| X2 | Lithium Nitrate 1%, Nitrate of Potash 79%, Sodium Nitrate 10%, Sodium Nitrite 10% | 0 | — |

Performance test. Test the performance of ternary nano molten nitrate salt prepared by X1, X2, No. 1-25 of the Embodiment 3.

(1) Heat Stability Test:

Gravimetric method is applied to the testing. (The method is the same as Embodiment 1): Use this method to test X1, X2 and the ternary nano molten nitrate salt of No. 1~25 in Embodiment 3 respectively. Then get the table 10 according to testing data.

TABLE 10

The Heat Stability Testing Data of Ternary Nano Molten Nitrate Salt

| Number of Ternary Nitrate Nano Molten Salt | Surplus Ratio % 120° C., Heat preservation for 10 hours | Surplus Ratio % 550° C., Heat preservation for 20 hours | Surplus Ratio % 570° C., Heat preservation for 35 hours | Surplus Ratio % 600° C., Heat preservation for 46 hours |
|---|---|---|---|---|
| X1 | — | 96 | 86 | 70 |
| X2 | — | 97 | 84 | 69 |
| No. 1 | — | 95 | 83 | 68 |

TABLE 10-continued

The Heat Stability Testing Data of Ternary Nano Molten Nitrate Salt

| Number of Ternary Nitrate Nano Molten Salt | Surplus Ratio % 120° C., Heat preservation for 10 hours | Surplus Ratio % 550° C., Heat preservation for 20 hours | Surplus Ratio % 570° C., Heat preservation for 35 hours | Surplus Ratio % 600° C., Heat preservation for 46 hours |
|---|---|---|---|---|
| No. 2  | —   | 96  | 87  | 67  |
| No. 3  | —   | 98  | 86  | 65  |
| No. 4  | —   | 94  | 85  | 63  |
| No. 5  | —   | 97  | 82  | 68  |
| No. 6  | —   | 98  | 90  | 80  |
| No. 7  | —   | 99  | 88  | 77  |
| No. 8  | —   | 98  | 89  | 79  |
| No. 9  | —   | 99  | 87  | 78  |
| No. 10 | —   | 98  | 89  | 79  |
| No. 11 | 100 | 100 | 100 | 98  |
| No. 12 | 100 | 100 | 100 | 97  |
| No. 13 | 100 | 100 | 100 | 97  |
| No. 14 | 100 | 100 | 100 | 99  |
| No. 15 | 100 | 100 | 100 | 98  |
| No. 16 | 100 | 100 | 100 | 99  |
| No. 17 | 100 | 100 | 100 | 98  |
| No. 18 | 100 | 100 | 100 | 98  |
| No. 19 | 100 | 100 | 100 | 97  |
| No. 20 | 100 | 100 | 100 | 100 |
| No. 21 | 100 | 100 | 100 | 99  |
| No. 22 | 100 | 100 | 100 | 100 |
| No. 23 | 100 | 100 | 100 | 100 |
| No. 24 | 100 | 100 | 100 | 99  |
| No. 25 | 100 | 100 | 100 | 98  |

Remarks:—in the above table – represents that the heat transfer and thermal storage medium is solid state, its surplus ratio cannot be tested.

Through the Table 10, we can see that the heat transfer and thermal storage media of X1, X2 molten salt as well as the ternary nano nitrate molten salt of group No. 1~No. 10 are all solid at 120° C., and their surplus ratio cannot be tested. But when the temperature rises to 550° C., it can mainly operate stably. When the temperature rises to 570° C., there will exist obvious loss of components due to the decomposition. After the loss, the surplus ratio of X1 is 86%, while X2's is 84%. By comparison, the components loss of the ternary nano nitrate molten salt caused by medium decomposition is relatively less in Group No. 1~No. 10 of Embodiment 3. But when the operation is lasting for 46 hours, and the insulation is 600° C., the loss ratio of X1, X2 are respectively reaching up to 30% and 31%. And the components loss of heat transfer and thermal storage medium of ternary nano nitrate molten salt in Group No. 1~No. 10 of Embodiment 3 is also increasing.

By comparison, the components loss of heat transfer and thermal storage medium of the ternary nano nitrate molten salt in Group No. 10~No. 25 of Embodiment 3 has reduced obviously at each temperature of experiment. The medium can operate stably from 120° C. to 600° C., and at that condition, there is almost no components loss of the medium in Group No. 10~No. 25. Through these data, we can see that the stability of the heat transfer and thermal storage medium at 600° C. can be improved efficiently by the technological conditions in Group No. 10~No. 25 as well as adding nano particles of specific diameter and specific dosage to the ternary molten nitrate salt.

(2) The Lowest Melting Temperature and the Latent Heat of Phase Change Testing:

Use the universal differential scanning calorimeter (DSC) to test the lowest melting temperature and the latent heat of phase change of molten salt sample. The results are shown as table 3.

It shows that compared with the molten salt system of X1, X2 with available technology, the lowest melting temperature of the ternary nano nitrate molten salt in Group No. 1~No. 25 of Embodiment 3 has reduced, and the latent heat of phase change has increased. Thus we can keep that when the heat transfer and thermal storage medium run at lower limit of temperature, we can increase its upper limit of temperature at the same time to assure its safe use. So that the range of the using temperature of the medium can be widen.

(3) Compared with ternary nitrate molten salt, the contraction ratio of phase change volume of heat transfer and thermal storage medium of the ternary nano nitrate molten salt in Group No. 1~No. 25 is reduced, and the thermal conductivity is increased The concrete data of the contraction ratio reduced is shown as table 11.

The method and process above are adopted for the performance testing, testing results are shown as Table 11, among which the increasing percentage of latent heat and the reducing percentage of volume contraction respectively compare with ordinary ternary molten nitrate salt $KNO_3$—$NaNO_3$—$NaNO_2$. Define the relative values of the latent heat and the volume contraction of $KNO_3$—$NaNO_3$—$NaNO_2$ are 1, then the chart shows the corresponding increasing percentage of latent heat and the corresponding reducing percentage of volume contraction of the media of ternary nano molten nitrate salt in Group No. 1~No. 25 in Embodiment 3 and X1, X2.

TABLE 11

The Performance Test Indexes of Ternary Nano Nitrate Molten Salt Group No. 1~No. 25 in Embodiment 3 and X1, X2

| Number | The lowest melting temperature | The increased percentage of latent heat of phase change | The reduced percentage of volume contraction |
|---|---|---|---|
| X1 | 145 | 0.04 | 0.03 |
| X2 | 148 | 0.06 | 0.02 |
| No. 1 | 135 | 0.16 | 0.11 |
| No. 2 | 132 | 0.16 | 0.13 |
| No. 3 | 130 | 0.14 | 0.12 |
| No. 4 | 131 | 0.15 | 0.14 |
| No. 5 | 133 | 0.18 | 0.12 |
| No. 6 | 125 | 0.15 | 0.14 |
| No. 7 | 128 | 0.17 | 0.13 |
| No. 8 | 125 | 0.15 | 0.16 |
| No. 9 | 127 | 0.16 | 0.15 |
| No. 10 | 128 | 0.14 | 0.15 |
| No. 11 | 113 | 0.17 | 0.10 |
| No. 12 | 119 | 0.16 | 0.12 |
| No. 13 | 118 | 0.15 | 0.16 |
| No. 14 | 116 | 0.18 | 0.14 |
| No. 15 | 118 | 0.15 | 0.14 |
| No. 16 | 119 | 0.16 | 0.12 |
| No. 17 | 112 | 0.17 | 0.13 |
| No. 18 | 113 | 0.18 | 0.12 |
| No. 19 | 116 | 0.16 | 0.14 |
| No. 20 | 115 | 0.18 | 0.13 |
| No. 21 | 111 | 0.19 | 0.14 |
| No. 22 | 110 | 0.18 | 0.15 |
| No. 23 | 111 | 0.17 | 0.17 |
| No. 24 | 116 | 0.18 | 0.15 |
| No. 25 | 118 | 0.19 | 0.16 |

Through Table 11 we can see that compared with the heat transfer and thermal storage medium of molten salt of X1, X2, the media of the ternary nano molten nitrate salt are mainly kept at the lowest melting temperature, so that it can assure the using temperature of the medium when it is at a low temperature. Meanwhile, compared with the heat transfer and thermal storage medium of molten salt of X1, X2, the latent heat of phase change has increased, and the volume contraction has reduced. Explanation: By adding nano particles to ternary molten nitrate salt system, we can limit volume contraction of the molten salt material when it is phase changing, and reduce the volume contraction ratio of the heat transfer and thermal storage medium, thus increasing the thermal conductivity of the medium.

By comparing the data of Table 11 carefully, we can find that the lowest melting temperature of the ternary nano molten nitrate salt in Group No. 11~No. 25 of Embodiment 3 is much lower, the latent heat of phase change has increased much more, and the volume contraction ratio has reduced much more. In general, every performance index of the heat transfer and thermal storage medium of the ternary nano molten nitrate salt in Group No. 11~No. 25 of Embodiment Example 3 is better.

Embodiment 4 The Steps of Preparing Polybasic Nitrate Nano Molten Salt

The Table 12 below shows the proportion of polybasic nano molten nitrate salt of Embodiment Example 4. It shows the formulas of different polybasic nano molten nitrate salt and the diameter of nano particles in the formula.

TABLE 12

Formula of Polybasic NanoNitrate Molten Salt

| Number of Polybasic Nano Nitrate Molten Salt | The Mass Percentage of Polybasic Nitrate Molten Salt/% | The Kinds of Nano Particle and their Mass Percentage of the Whole Quality in Polybasic Molten Salt System/% | The Diameter of Nano Particle/nm |
|---|---|---|---|
| No. 1 | Nitrate of Potash 20, | Silica ($SiO_2$) 1 | 10 nm |
| No. 2 | Sodium Nitrate 20, | Zinc Oxide (ZnO) 1 | 10 nm |
| No. 3 | Sodium Nitrite 50, | Aluminum Oxide ($Al_2O_3$) 1 | 10 nm |
| No. 4 | Cesium Nitrate 10 | Titanium Dioxide ($TiO_2$) 1 | 10 nm |
| No. 5 | | Magnesia (MgO) 1 | 10 nm |
| No. 6 | Nitrate of Potash 60, | Silica ($SiO_2$) 5 | 30 nm |
| No. 7 | Sodium Nitrate 10, | Calcium Oxide (CaO) 5 | 30 nm |
| No. 8 | Sodium Nitrite 25, | Aluminum Oxide ($Al_2O_3$) 5 | 30 nm |
| No. 9 | Cesium Nitrate 5 | Titanium Dioxide ($TiO_2$) 5 | 30 nm |
| No. 10 | | Magnesia (MgO) 5 | 30 nm |
| No. 11 | Nitrate of Potash 60, | Silica ($SiO_2$) 3 | 20 nm |
| No. 12 | Sodium Nitrate 20, | Zinc Oxide (ZnO) 3 | 20 nm |
| No. 13 | Sodium Nitrite 10, | Aluminum Oxide ($Al_2O_3$) 3 | 20 nm |
| No. 14 | Cesium Nitrate 10 | Titanium Dioxide ($TiO_2$) 3 | 20 nm |
| No. 15 | | Magnesia (MgO) 3 | 20 nm |
| No. 16 | Nitrate of Potash 40, | Silica ($SiO_2$) 3 | 20 nm |
| No. 17 | Sodium Nitrate 15, | Zinc Oxide (ZnO) 3 | 20 nm |
| No. 18 | Sodium Nitrite 38, | Aluminum Oxide ($Al_2O_3$) 3 | 20 nm |
| No. 19 | Cesium Nitrate 7 | Titanium Dioxide ($TiO_2$) 3 | 20 nm |
| No. 20 | | Magnesia (MgO) 3 | 20 nm |
| No. 21 | Nitrate of Potash 40, Sodium Nitrate 15, | Silica ($SiO_2$) 1.5, Zinc Oxide (ZnO) 1.5, Calcium Oxide (CaO) 0.5 | 20 nm |
| No. 22 | Sodium Nitrite 38, Cesium Nitrate 7 | Silica ($SiO_2$)1, Zinc Oxide (ZnO) 1, $Al_2O_3$ 1 | 20 nm |
| No. 23 | | Silica ($SiO_2$)1, Zinc Oxide (ZnO) 1, Aluminum Oxide ($Al_2O_3$) 0.5, Titanium Dioxide ($TiO_2$) 0.5 | 20 nm |
| No. 24 | | Silica ($SiO_2$) 0.6, Zinc Oxide (ZnO) 0.6, Aluminum Oxide ($Al_2O_3$) 0.6, Titanium Dioxide ($TiO_2$) 0.6, Magnesia (MgO) 0.6 | 20 nm |

TABLE 12-continued

Formula of Polybasic NanoNitrate Molten Salt

| Number of Polybasic Nano Nitrate Molten Salt | The Mass Percentage of Polybasic Nitrate Molten Salt/% | The Kinds of Nano Particle and their Mass Percentage of the Whole Quality in Polybasic Molten Salt System/% | The Diameter of Nano Particle/nm |
|---|---|---|---|
| No. 25 | | Zinc Oxide (ZnO) 1, Aluminum Oxide ($Al_2O_3$) 1, Titanium Dioxide ($TiO_2$) 0.5, Magnesia (MgO) 0.5 | 20 nm |

The performance test for polybasic nitrate nano molten salt prepared and obtained is as follows:

1. Thermal Stability Test (the Test Method and Procedure are the Same to that of Embodiment 3)—the Test Method and Procedure for X1 and X2 are the Same to that of Embodiment 3.

The methods above-mentioned are respectively adopted to conduct thermal stability tests on polybasic nitrate nano molten salt shown in Table 12 and contrast X1 and contrast X2. The test results are shown in Table 13.

TABLE 13

Test data of stability of polybasic nitrate nano molten salt

| Number of polybasic nitrate nano molten salt | Loss rate %, 550, insulate for 30 hs. | Loss rate %, 550, insulate 50 hs. | Loss rate %, 600, insulate 35 hs | Surplus ratio %, 600, insulate for 50 hs. |
|---|---|---|---|---|
| X1 | 4 | 14 | 18 | 21 |
| X2 | 3 | 16 | 25 | 33 |
| No. 1-No. 5 | 2-3 | 7-9 | 10-12 | 12-15 |
| No. 6-No. 10 | 2-3 | 5-8 | 9-10 | 10-12 |
| No. 11-No. 15 | 1-2 | 5-7 | 6-8 | 8-10 |
| No. 16-No. 20 | 0-1 | 1-2 | 4-5 | 7-9 |
| No. 21-No. 25 | 0-1 | 0-1 | 2-3 | 6-8 |

It can be concluded from Table 13 that the stable temperature limit of contrast X1 is 550. The its loss rate is around 4% when it insulates for 30 hours at 550. The loss rate is around 14% when it insulates for 50 hours. The temperature limit of contrast X2 is 550. its loss rate is around 3% when it insulates for 30 hours at 550. The loss rate is around 16% when it insulates for 50 hours.

The loss rate of No. 1-No. 25 polybasic nitrate nano molten salts prepared under the invention at 600 is close to that of contrast at 550. The result means that the invented product has better thermal stability and can be operated for longer time stably at 600.

2. Tests of Minimum Melting Temperature and Latent Heat of Phase Change:

The universal differential scanning calorimetry (DSC for short) is adopted to test minimum melting temperature and latent heat of phase change of samples of molten salt. Test results are shown in Table 14.

The results show that the minimum melting temperature and latent heat of phase change of polybasic nitrate nano molten slat No. 1-No. 25 prepared by the invention is compared with the molten salt system of X1 and X2 of the existing technology, the minimum melting temperature is reduced and latent heat of phase change is increased, therefore the safe upper limit operating temperature of the polybasic nitrate nano molten salt heat transfer and heat storage medium of the invention is increased while the low lower limit operating temperature can be guaranteed at the same time to make the operating temperance of polybasic nitrate nano molten salt heat transfer and heat storage medium more wide.

3. Shrinkage Test of Phase Change:

Compared to contrast X1 and X2 nitrate molten salts, shrinkage rate of phase change volume of heat transfer and storage mediums of No. 1-No. 25 polybasic nitrate molten salts prepared under present invention is reduced and thermal conductivity is increased. Detailed data of the reduction of shrinkage rate of phase change volume of heat transfer and storage mediums of No. 1-No. 25 polybasic nitrate nano molten salt prepared under present invention are shown in Table 14.

The above-mentioned methods and steps adopted for the performance testing methods and steps. Test results are shown in Table 14, in which the increased percent of latent heat of phase change and decreased percent of volume shrinkage percentage are respectively compared to ordinary ternary nitrate molten salt $KNO_3$—$NaNO_3$—$NaNO_2$. When relative value between latent heat of phase change and volume shrinkage of common ternary nitrate molten salt $KNO_3$—$NaNO_3$—$NaNO_2$ is defined to be 1, it represents that the value of increase in corresponding latent heat of phase change versus decrease percentage of volume shrinkage of No. 1-No. 25 heat transfer and storage mediums of multivariate nitrate nano molten salt and X1 and X2 heat transfer and storage mediums.

TABLE 14

Testing data of melting points of molten salts

| Number of polybasic nitrate nano molten salt | Minimum melting temperature (° C.) | Increased percentage of latent heat of phase change | Decreased percent of volume shrinkage |
|---|---|---|---|
| X1 | 145 | 0.04 | 0.03 |
| X2 | 148 | 0.06 | 0.02 |
| No. 1-5 | 130-135 | 0.14-0.18 | 0.11-0.14 |
| No. 6-No. 10 | 126-130 | 0.15-0.18 | 0.13-0.16 |
| No. 11-No. 15 | 113-119 | 0.16-0.18 | 0.13-0.16 |
| No. 16-No. 20 | 110-116 | 0.17-0.18 | 0.12-0.16 |
| No. 21-No. 25 | 110-113 | 0.18-0.19 | 0.15-0.17 |

It is concluded from Table 14 that the heat transfer and storage mediums of polybasic nitrate nano molten salt prepared under present invention are basically maintained at lower melting temperature comparing with X1 and X2 molten salt heat transfer and storage mediums, and the low operating temperature of heat transfer and storage medium of ploybasic nitrate nano molten salt prepared under present invention is ensured. Meanwhile, the latent heat of phase change of heat transfer and storage medium of polybasic nitrate nano molten salt prepared under present invention is improved comparing with X1 and X2 molten salt heat transfer and storage mediums, and the volume shrinkage is reduced. Note: This invention limits the volume shrinkage of molten salt materials during their phase changes by adding nanoparticles into poly-basic nitrate molten salts, reduces the volume shrinkage ratio of heat transfer and storage mediums of poly-basic nitrate nano molten salts, improves the thermal conductivity of heat transfer and storage medium of poly-basic nitrate nano molten salt under current invention.

It can be concluded by carefully comparing Table 14 that minimum melting temperature of No. 16-No. 25 heat transfer and storage mediums of polybasic nitrate nano molten salts prepared under present invention is lower, the numerical value of the increase in latent heat of phase change and decrease in volume shrinkage is more. Generally, performance indicators of No. 16-No. 25 heat transfer and storage mediums of polybasic nitrate nano molten salts prepared under present invention are better.

Embodiment 5 Preparation Method of Heat Transfer and Storage Medium of Carbonate Nano Molten Salt 1) The gas phase is adopted to prepare metal oxide nanoparticles MgO and/or non-metal oxide nanoparticles $SiO_2$ (note that the nanoparticles in this step can be obtained by commercially purchase available, and nanoparticles obtained via commercial purchase also achieve the purpose of this invention);

2) Evenly mix the sodium chloride and lithium carbonate, add it into molten salt tank from the charging port. Open the valve between the interlayer and solar heat corrector system and have heat carrier heated by solar heat collecting system flow to the interlayer and heat statically to complete melting of solid in molten salt tank, insulate 10~30 min, naturally cool to room temperature and conduct mechanical crushing;

Then add potassium carbonate and sodium carbonate into the molten salt tank, stir to have them evenly mixed. Obtain carbonate molten salt system, and then statically heat the molten salt tank with heat carrier heated by solar heat collector system to degas and dewater to make it into molten state. The heating temperature will be 50~100 over that of phase change of molten salt and then insulate for 10~30 min.

3) Add nanoparticles obtained at Step 1) to the above-mentioned molten salt tank, mechanically stir molten mixture for 0.5~1 h to initially mix evenly, insulate and stir for 0.5~1 h again to mix fully to obtain high temperature molten salt.

4) Open the discharging port of the molten salt tank, pump carbonate molten salt obtained in Step 3) into the airflow crushing dryer with molten salt pump, simultaneously have high-temperature conduction oil in molten salt tank oil heat the air through heat exchange device to obtain the hot air required, and then make the hot air flow from the bottom of airflow crushing drying tower to the airflow crushing dryer, and granulate to obtain stable and uniform heat transfer and storage mediums of carbonate nano molten salts.

5) Put heat transfer and storage mediums of carbonate nano molten salts obtained at step 4) into the bin, and separately packed and saved.

It is important to note that the device used in the embodiment is the device independently developed by the inventor, and the device is equipped with two sets of heating units, including mobile-type electric tracing and solar heat collection, and the heating approach may be chosen in the process of production according to specific conditions of heating. The heat carrier in the molten salt tank interlayer may be high-temperature heat conduction oil or molten salt or superheated steam. After these heat carriers heat the molten salts in the molten salt tank, make full use of the waste heat to have it flow to the heat exchanger to heat hot air.

Table 15 demonstrates formulas for carbonate nano molten salt prepared according to the preparation method in embodiment 5 and particle size of nanoparticles, and the heat transfer and storage mediums bearing lithium carbonate molten salt and corresponding preparation method disclosed in Chinese invention patent application numbered 200910037348.7 in formula (X3) of molten salt carbonate according to existing technologies, X3 is lithium bearing carbonate molten salt (excluding nanoparticles) obtained by the inventor of this invention according to the formula and preparation method recorded in Implementation Case 4 of his/her specification;

TABLE 15

Carbonate nano molten salt formulas and corresponding particle sizes of nanoparticles prepared in embodiment 5

| Carbonate nano molten salt no. | Parts by weight rate/kg of carbonate nano molten salt | Category and parts by weight rate/kg of nano particle | Average grain size/nm of nano particles |
|---|---|---|---|
| No. 1 | Potassium carbonate 39, | $SiO_2$ 1; MgO 1 | 10 |
| No. 2 | sodium carbonate 46, | ZnO 3; CaO 1 | 22 |
| No. 3 | lithium carbonate 14.7, sodium chloride 0.3 | $Al_2O_3$ 4 | 12 |
| No. 4 | Potassium carbonate 30, | $TiO_2$ 1.5 | 18 |
| No. 5 | sodium carbonate 50, lithium carbonate 30, sodium chloride 10 | MgO 1.2; ZnO 1; $TiO_2$ 0.4; $Al_2O_3$ 1.6; $SiO_2$ 0.8; CaO 1 | 30 |
| No. 6 | Potassium carbonate 60, | $SiO_2$ 1.3; ZnO 0.7 | 20 |
| No. 7 | sodium carbonate 20, lithium carbonate 10, sodium chloride 5 | $SiO_2$ 1.5; ZnO 0.5; $Al_2O_3$ 2.0; CaO 0.5 | 14 |
| No. 8 | Potassium carbonate 35, | $Al_2O_3$ 0.7; MgO 0.3 | 19 |
| No. 9 | sodium carbonate 35, lithium carbonate 25, | $TiO_2$ 1.0; MgO 0.2; $Al_2O_3$ 0.8 | 23 |
| No. 10 | sodium chloride 9 | MgO 2.0; CaO 0.8 | 16 |
| No. 11 | Potassium carbonate 50, | $SiO_2$ 1.5; $Al_2O_3$ 1.5 | 13 |
| No. 12 | sodium carbonate 25, | ZnO 1.3; $TiO_2$ 1.7 | 17 |
| No. 13 | lithium carbonate 15, sodium chloride 7 | $Al_2O_3$ 1.2; $TiO_2$ 1.8; CaO 1.3 | 15 |
| No. 14 | | ZnO 1; $TiO_2$ 1; MgO 1 | 20 |
| No. 15 | | ZnO 1.0; $TiO_2$ 0.3; $Al_2O_3$ 0.6; $SiO_2$ 1.1 | 27 |
| No. 16 | Potassium carbonate 30, | $TiO_2$ 1.3; $SiO_2$ 2.7 | 11 |
| No. 17 | sodium carbonate 20, lithium carbonate 10, | MgO 1.2; ZnO 1.8; $Al_2O_3$ 1.0 | 15 |
| No. 18 | sodium chloride 10 | MgO 2.1; ZnO 1.9; CaO 1 | 28 |
| No. 19 | | MgO 1.4; ZnO 0.6; $Al_2O_3$ 1.1; $SiO_2$ 0.9 | 14 |
| No. 20 | Potassium carbonate 35, | $SiO_2$ 4; CaO 1 | 16 |
| No. 21 | sodium carbonate 25, | ZnO 2.3; $Al_2O_3$ 1.7 | 23 |
| No. 22 | lithium carbonate 15, sodium chloride 9 | MgO 3.4; $TiO_2$ 0.6 | 25 |
| No. 23 | Potassium carbonate 40, sodium carbonate 30, | MgO 0.4; ZnO 0.7; $TiO_2$ 1.1; $SiO_2$ 1.8 | 24 |
| No. 24 | lithium carbonate 8, sodium chloride 3 | MgO 0.9; $Al_2O_3$ 0.2; $SiO_2$ 2.9 | 12 |
| No. 25 | | MgO 0.3; ZnO 2.4; $SiO_2$ 1.4; CaO 0.7 | 20 |
| X3 | Potassium carbonate 46%, sodium carbonate 30%, lithium carbonate 20.87%, sodium chloride 3.13% | 0 | — |

Performance test for carbonate nano molten salts of X3 and No. 1~25 carbonate nano molten salt groups of present invention (1) Thermal Stability Test (the Methods and Steps are the Same to Those of Embodiment 3):

The above mentioned methods are respectively applied to test X3 and No. 1~25 carbonate nanometer molten salt groups of present invention, and Table 16 is obtained according to test data.

TABLE 16

Test data of thermal stability of molten salts

| Number of carbonate nano molten salt group | Loss rate %, 600, insulate 30 hours | Loss rate %, 700, insulate 40 hours | Loss rate %, 816, insulate 40 hours | Loss rate %, 821, insulate 35 hours |
|---|---|---|---|---|
| X3 | 0 | 0 | 1 | 7 |
| No. 1~5 | 0 | 0 | 0~0.5 | 0.9~1.2 |
| No. 6~10 | 0 | 0 | 0.2~1 | 1.1~1.5 |
| No. 11~15 | 0 | 0 | 0.1~0.8 | 0.9~1.4 |
| No. 15~20 | 0 | 0 | 0.4~0.5 | 0.8~1.7 |
| No. 21~25 | 0 | 0 | 0.2~0.7 | 0.8~1.2 |

It can be concluded that the loss rate of contrast X3 at 700 and below is 0, and its loss rate is 1% when the temperature rises to 816 and insulate 40 hours, and loss rate is 7% when the temperature rises to 821 and insulate 35 hours. By contrast, the loss rate of carbonate nano molten salt group prepared under present invention at 700 and below is 0. Its loss rate is 1% and below when the temperature rises to 816 and insulate for 40 h. The loss rate is 0.8~1.7% when the temperature rises to 821 and insulate 35 hours. Obviously, carbonate nano molten salt group and X3 carbonate molten salt in embodiment prepared under present invention may operate stably at 800, and the thermal stability of molten salt of carbonate nano molten salt group prepared under present invention is better when it is compared, and the afterheat of the corresponding temperature at 800 above is greater.

(2) Tests for latent heat of phase change and melting point: General differential scanning calorimetry (DSC) is adopted to carry out the tests for melting point of molten salt sample and latent heat of phase change. Test results are shown in Table 17. The results show that the melting point and latent heat of phase change of carbonate nano molten salts prepared from No. 1~25 carbonate nano molten salt groups prepared under present invention decreases and increases respectively when it is compared to those of molten salt systems with existing technology X3 so as to reduce lower limit temperature of heat transfer and storage medium of carbonate nano molten salt while maintaining high limit service temperature, widening the service temperature of heat transfer and storage medium of carbonate nano molten salt prepared under present invention.

(3) Phase change volume shrinkage test: Conventional test method for volume shrinkage rate in existing technologies is adopted. Comparing with the contrast X3 carbonate molten salt, the volume shrinkage rate of phase change of carbonate nano molten salt heat transfer and heat storage medium prepared by carbonate nano molten salt group No. 1-25 of the invention is reduced and thermal conductivity is increased. See table 17 for the detailed data of the reduction of volume shrinkage of phase change of carbonate nano molten salt heat transfer and heat storage medium prepared by the group No. 1-25 of carbonate nano molten salt of the invention.

Above-mentioned methods and steps are adopted for performance, and test results are shown in Table 17, in which the volume shrinkage percentage is compared to ordinary carbonate molten salt X3, and the corresponding volume shrinkage percent values of heat transfer and storage mediums of carbonate nano molten salts prepared from No. 1~25 carbonate nano molten salt groups prepared under present invention are shown in the following table.

TABLE 17

Performance test data of No. 1~25 carbonate nano molten salt groups and X3 prepared under present invention

| Number | Melting point ( ) | Latent heat of phase change J/g | Volume shrinkage percent |
|---|---|---|---|
| X3 | 392 | 98 | 0.2 |
| No. 1~5 | 262~230 | 260~296 | 0.07~0.10 |
| No. 6~10 | 265~235 | 250~288 | 0.08~0.11 |
| No. 11~15 | 263~234 | 256~291 | 0.09~0.10 |
| No. 16~20 | 260~230 | 262~290 | 0.08~0.09 |
| No. 21~25 | 261~230 | 263~300 | 0.09~0.11 |

It can be concluded from Table 17: The heat transfer and storage mediums of carbonate nano molten salts prepared under present invention are maintained at low melting point temperature when it is compared to those of X3 molten salts, guaranteeing low service temperature of heat transfer and storage mediums of carbonate nanometer molten salt prepared under present invention. Meanwhile, the latent heat of phase change of heat transfer and storage mediums of carbonate nano molten salts prepared under present invention is increased significantly compared to thoseof X3 molten salts, which may results from the change in the structure of molten salt carbonate matrix due to the addition of nanoparticles, and the carbonate molten salt under present invention with the addition of nanoparticles also limits great volume shrinkage while the phase change of solid & liquid occurs, and the volume shrinkage ratio is decreased by 10 percentage approximately when it is compared to that of X3 carbonate molten salt without adding nanoparticles. Notes: This invention limits the volume shrinkage of molten salt materials during phase change by adding nanoparticles in general system of carbonate molten salt, reduces volume shrinkage ratio of heat transfer and storage medium of carbonate nano molten salt, improves the thermal conductivity of heat transfer and storage medium of carbonate nano molten salt under present invention. Generally, performance indicators of heat transfer and storage mediums of carbonate nanom molten salts prepared from No. 1~25 carbonate nano molten salt groups prepared under present invention are better.

The heat transfer and storage mediums of nano molten salt listed in embodiments under present invention are used as service methods of solar photo-thermal power generation, the heat transfer and storage medium of nitrate molten salts in existing technology may be referred and used as service methods for solar photo-thermal power generation. In addition, the heat transfer and storage mediums of nano molten salts under present invention may reduce auxiliary insulation devices, measures, solidification prevention equipment of heat transfer and storage medium of molten salt and investment costs of solar photo-thermal power generation on the basis of original equipment.

Finally it shall be noted that above-mentioned embodiments are only used to describe technical solutions of this invention rather than imposing limitations. Although detailed description is made for present invention by referring to foregoing embodiments, common technicians in this field shall understand that technical solutions recorded in foregoing embodiments may be still modified or equivalent replacement for partial technical characteristics may be. While such modification or replacement doesn't separate the essence of the corresponding technical solution out of the philosophy and scope of technology solutions under present invention.

The invention claimed is:

1. A heat transfer and thermal storage medium comprising metal oxide nanoparticles compounded with a nitrate molten salt system, wherein:
the metal oxide nanoparticles are selected from the group consisting of ZnO, $Al_2O_3$, $TiO_2$, and MgO nanoparticles, an average particle diameter of the nanoparticle is 10-30 nm, and a weight ratio of the nanoparticle in said heat transfer and thermal storage medium is 1-5%;
the nitrate molten salt system is a ternary nitrate molten salt system, wherein
the ternary nitrate molten salt system is $KNO_3$—$NaNO_3$—$NaNO_2$ consisting of, in relative parts by weight, potassium nitrate 30-47, sodium nitrate 12-15, and sodium nitrite 22-40.

2. A method comprising using said heat transfer and thermal storage medium of the nano molten salt of claim 1 in industrial energy storage or solar thermal power generation.

3. A method for preparing heat transfer and thermal storage medium of the nano molten salt comprising:
heating a molten salt system into a molten state;
adding metal oxide nanoparticles in proportion into the melted molten salt system, and insulating after stirring evenly to obtain a high-temperature molten salt; and
cooling said high-temperature molten salt to obtain the heat transfer and thermal storage medium of the nano molten salt,
wherein said metal oxide nanoparticles are selected from the group of ZnO, $Al_2O_3$, $TiO_2$, and MgO nanoparticles, and the average particle diameter of said nanoparticle is 10-30 nm,
wherein the molten salt system is ternary nitrate molten salt system
the ternary nitrate molten salt system is $KNO_3$—$NaNO_3$—$NaNO_2$ consisting of, in relative parts by weight, potassium nitrate 30-47, sodium nitrate 12-15, and sodium nitrite 22-40.

4. A method for preparing as in claim 3 further comprising using devices including a portable electric tracing, a solar energy collector system, a molten salt tank with jacketing, a gas flow crushing dryer, a hot air generator, a granulating device, cooling equipment, stirring equipment, and an inlet of feed,
wherein said molten salt tank, said gas flow crushing dryer, said granulating device, and said cooling equipment are connected in series by pipe sequentially, wherein the hot air generator and said gas flow crushing dryer are connected in series by pipe, wherein the portable electric tracing and said solar energy collector system are connected in parallel to each other, which are in series with the jacketing by pipe respectively;
wherein said stirring equipment is located in said molten salt tank, said inlet of feed is located on the top of molten salt tank.

5. A method for preparing as in claim 4, which is characterized in that another pipe from said solar energy collector system is connected in series with jacketing, and a high-temperature storage tank is set on said another pipe.

6. A method for preparing as in claim 5, which is characterized in that said hot air maker is a heat exchanger, said jacketing, said heat exchanger, said gas flow crushing dryer are connected in series one by one through a pipeline, wherein said heat exchanger is connected with one air blower.

7. A method for preparing as in claim 6, which is characterized in that said device also includes a cryogenic storage tank, wherein said heat exchanger is connected in series with the cryogenic storage tank by pipe, wherein there is a pump from the said cryogenic storage tank by pipe, and there are two pipes from said pump, which are connected in series with said solar energy collector system and the portable electric tracing respectively, wherein there are respectively valves between the pump and the said solar energy collector system, and between the pump and the portable electric tracing, wherein said valves are used to control the flowing direction of heat carrier in the cryogenic storage tank.

8. The heat transfer and thermal storage medium as in claim 1,
the ternary nitrate molten salt system $KNO_3$—$NaNO_3$—$NaNO_2$ consisting of, in relative parts by weight, the potassium nitrate 45, the sodium nitrate 14, and the sodium nitrite 40.

9. The heat transfer and thermal storage medium as in claim 1,
the ternary nitrate molten salt system $KNO_3$—$NaNO_3$—$NaNO_2$ consisting of, in relative parts by weight, the potassium nitrate 30, the sodium nitrate 15 and the sodium nitrite 40.

10. The heat transfer and thermal storage medium as in claim 1,
the ternary nitrate molten salt system $KNO_3$—$NaNO_3$—$NaNO_2$ consisting of, in relative parts by weight, the potassium nitrate 35, the sodium nitrate 12 and the sodium nitrite 22.

11. The heat transfer and thermal storage medium as in claim 1,
the ternary nitrate molten salt system $KNO_3$—$NaNO_3$—$NaNO_2$ consisting of, in relative parts by weight, the potassium nitrate 47, the sodium nitrate 13 and the sodium nitrite 30.

* * * * *